United States Patent [19]
Umemoto et al.

[11] Patent Number: 4,939,766
[45] Date of Patent: Jul. 3, 1990

[54] RADIO TELEPHONE SYSTEM

[75] Inventors: Yuji Umemoto, Hino; Isao Sasaki, Hachioji, both of Japan

[73] Assignee: Kabushiki Kaisha Toshiba, Kawasaki, Japan

[21] Appl. No.: 216,688

[22] Filed: Jul. 8, 1988

[30] Foreign Application Priority Data

Jul. 10, 1987 [JP] Japan ............................... 62-173323

[51] Int. Cl.$^5$ ............................................. H01Q 7/04
[52] U.S. Cl. ........................................ 379/58; 379/61
[58] Field of Search ................. 379/58, 1, 63; 455/69, 455/33

[56] References Cited

U.S. PATENT DOCUMENTS

| | | | |
|---|---|---|---|
| 4,023,723 | 6/1977 | Memdoza | 379/61 |
| 4,593,273 | 6/1986 | Narcisse | 455/69 |
| 4,761,806 | 8/1988 | Toki | 379/61 |
| 4,775,995 | 10/1988 | Chapman et al. | 379/58 |
| 4,802,201 | 1/1989 | Yoshizawa et al. | 379/63 |

FOREIGN PATENT DOCUMENTS

| | | | |
|---|---|---|---|
| 0218450 | 4/1987 | European Pat. Off. | 379/63 |
| 0116027 | 5/1987 | Japan | 379/58 |

Primary Examiner—Robert Lev
Attorney, Agent, or Firm—Finnegan, Henderson, Farabow, Garrett, and Dunner

[57] ABSTRACT

A radio telephone system comprises a base unit electrically connected to a wire telephone line and at least one radio telephone set which can be connected to the base unit through a radio communication line. A predetermined threshold value is normally set for the intensity of a received electric field generated in the radio line so that, when the received electric field intensity does not reach the threshold value, for example when the radio telephone set is separated by more than a predetermined distance from the base unit, the radio communication line is automatically cut off. In the radio telephone system, the threshold value for the received electric field intensity can be arbitrarily modified by means of a suitable operating member disposed in the radio telephone set to thereby increase the flexibility of the radio telephone system. The operating member can comprise, of course, an exclusive key switch, a pushbutton switch or the like, or alternatively a dial key or the like previously provided in the radio telephone set may be commonly used also as the operating member.

29 Claims, 10 Drawing Sheets

FIG.1 (PRIOR ART)

FIG. 2 (PART I)
(PRIOR ART)

FIG. 2 (PART II)
(PRIOR ART)

RADIO TELEPHONE SYSTEM

BACKGROUND OF THE INVENTION

1. Field of the Invention

The present invention relates to a wireless or radio telephone system which realizes a wireless communication with a party at the end of a wire telephone line through a base unit connected to the wire telephone line.

2. Description of the Prior Art

Figure 1:
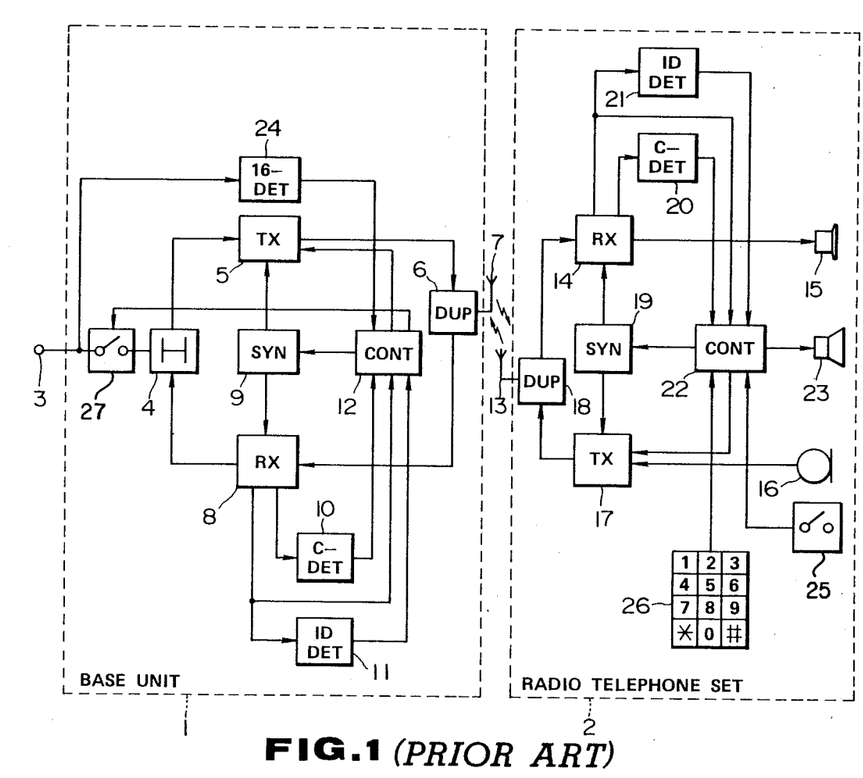
FIG. 1 is a block diagram showing an exemplary arrangement of a prior art radio telephone system.

In general, the radio telephone system of the type referred to has such an arrangement as shown in FIG. 1. In the drawing, reference numeral 1 denotes a base unit, 2 a wireless or radio telephone set, 3 a wire telephone line. The base unit 1 electrically connected to the wire telephone line 3 is coupled to the radio telephone set 2 through a radio communication line.

More specifically, a signal coming from the wire telephone line 3 is sent through a turned-on line relay 27 (which will be explained later) and a hybrid circuit 4 to a transmitter 5 as its modulation input to be modulated therein. The signal modulated in the transmitter 5 is sent to an antenna duplexer 6 and then radiated from an antenna 7 to the radio telephone set 2 in the form of electro-magnetic (radio) waves.

Electro-magnetic waves radiated from the radio telephone set 2, on the other hand, are received by the antenna 7 and then sent through the antenna duplexer 6 to a receiver 8 to form a demodulated signal therein. The demodulated signal is sent from the receiver 8 through the hybrid circuit 4 to the wire telephone line 3.

A synthesizer 9 provided in the base unit 1 functions to provide a signal of a frequency corresponding to a radio channel (in the illustrated example, the radio telephone communication system being assumed to have two types of channels, i.e., speech and control channels) to the transmitter 5 and the receiver 8 respectively.

On the basis of such a channel frequency signal (which specifies a radio channel), the transmitter 5 modulates its incoming signal from the telephone line 3 while the receiver 8 demodulates waves received at the antenna 7, respectively. In particular, the demodulated output of the receiver 8 is partly inputted to a received-field strength detector 10 to be used for judgement of the intensity of electric field in the radio communication. This detector 10 is generally called the carrier or noise squelch circuit. Another part of the demodulated output of the receiver 8, in particular, when the above control channel is specified, is inputted, as a data signal contained in the received and demodulated waves, to an identification signal detector 11 for collating an identification signal determined by the base unit and the radio telephone set 2 and also to a control circuit 12. This identification signal is usually referred to as the ID code.

Also inputted to the control circuit 12 are outputs of the detectors 10 and 11 which outputs are used, together with the demodulated output of the above data signal, to control an interconnection (which will be detailed later) between the base unit 1 and the radio telephone set 2. Further, this control circuit 12 controls the synthesizer 9 to switch the radio channels, and also sends a transmission data signal to the transmitter 5 as its modulation input.

The radio telephone set 2, like the base unit 1, contains an antenna 13, a receiver 14, a transmitter 17, an antenna duplexer 18, a synthesizer 19, a received-field strength detector 20, an identification signal detector circuit 21 and a control circuit 22.

A demodulated electric output of the receiver 14 is applied to a telephone handset 15 and is converted into a voice signal. A telephone mouthpiece 16 converts user's voice signal to an electric signal and applies it to a transmitter 17 as its modulation input. The transmitter 17 sends the modulated signal to the antenna duplexer 18 and then the antenna 13 to be radiated from the antenna in the form of electro-magnetic waves.

The synthesizer 19, the received-field strength detector 20 and the identification signal detector 21 are substantially the same as the equivalents in the base unit 1, and the control circuit 22 performs overall control over the radio telephone set 2. A loud speaker 23 comprises a sounder which emits a ringing tone in an incoming call mode.

Figure 2:
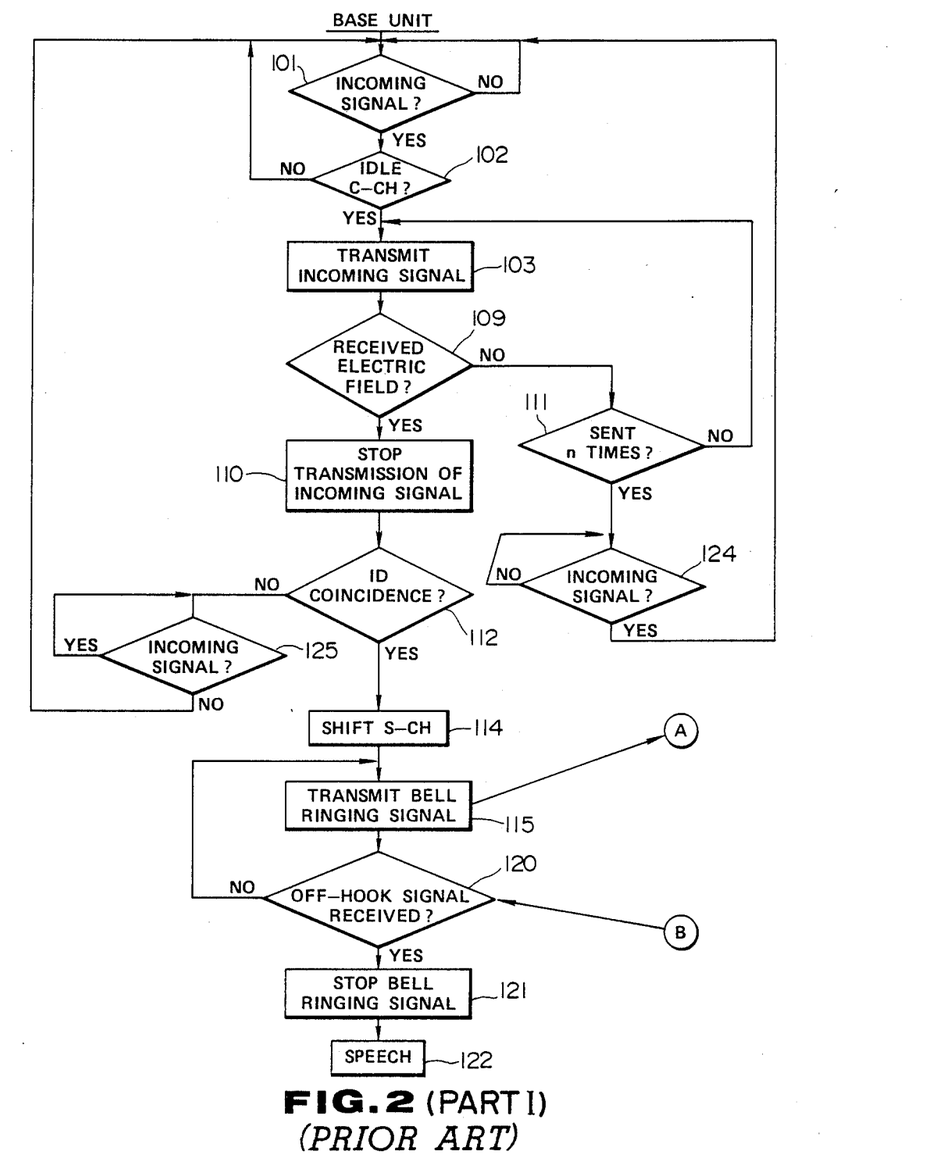
FIG. 2 is a flowchart for explaining the operation of the radio telephone system of FIG. 1 when receiving an incoming signal.

The control of the radio telephone system at the time of receiving an incoming call is schematically as shown by a flowchart in FIG. 2.

More in detail, when the base unit 1 in a wait mode detects at a ringing-tone detecting circuit 24 a ringing tone (having a frequency of 16 Hz) received from the wire telephone line 3 (step 101), the control circuit 12 examines whether or not the associated control channel (C-CH) is idle (step 102). If it is idle, then the control circuit controls the synthesizer 9 to cause the oscillation frequency of the synthesizer to be set at the frequency of the control channel so that the transmitter 5 is turned on to transmit the received signal (step 103). This received signal contains a speech-channel (S-CH) specifying signal.

On the side of the radio telephone set 2 in its wait mode, on the other hand, the synthesizer 19 is kept ON during a constant time t1 set by a timer circuit (incorporated in the control circuit 22) to have an oscillation frequency set at the frequency of the control channel, and the receiver 14 is also turned on (step 104). At this time, if the telephone set 2 receives an incoming signal (step 105), then the transmitter 17 is turned on (step 106) to send an answer signal in response to the incoming signal (step 107), whereby switching is made to the specified speech channel (step 113). If the telephone set receives no incoming signal, then the synthesizer 19 and the receiver 14 is kept OFF during a constant time t2 (step 108). The intermittent signal-receiving operation caused by the turning on and off of the receiver 14 is known as a battery saving phenomenon.

The base unit 1, when detecting radio waves radiated from the radio telephone set 2 at the received-field strength detector 10 (step 109), stops the transmission of the incoming signal (step 110). At this stage, when there is no detection of radio waves from the telephone set causes the base unit to repeats the transmission of the incoming signal up to a predetermined number of times n (step 111). The reason for this is that the radio telephone set 2 is arranged to intermittently receive the signal and cannot receive any signal during the aforementioned time t2. Further, the reason why the transmission is terminated after the n transmissions is to avoid the useless occupation of the control channel, for example when the power supply of the telephone set 2 is turned off or when the telepone set is located too far from the base unit.

Next, when the base unit detects an identity of the ID code (step 112), it switches the current speech channel to a speech channel (S-CH) specified by the received signal. If the control circuit fails to detect the ID code identity, then the ID code corresponds to a response from the other radio telephone sets and thus the base unit waits for the extinction of the call from the wire telephone line 3 and then returns to its wait mode (step 125).

The base unit 1, after having been switched to the speech channel, then transmits a bell sounding signal (step 115). The radio telephone set 2, when receiving the bell sounding signal (step 116), sends it to the sounder 23 to sound a ringing tone (step 117). In response to sounding of the ringing tone, when the telephone set user turns on a switch 25 to put the telephone set in its off-hook state (step 118), the telephone set 2 transmits an off-hook signal (step 119), whereby the telephone set 2 is put in its communication mode (step 123).

On the other hand, the base unit 1, when receiving the off-hook signal (step 120), stops the transmission of the previous bell sounding signal (step 121) and closes the line relay 27 to establish a speech loop with the wire telephone line 3, which also puts the base unit 1 in its speech mode (step 122).

When there is no detection of radio waves from the telephone set 2 and when the number of transmissions reaches n, the base unit detects the completion of signal reception from the wire telephone line (step 124) and returns to its wait mode, thus preventing the unnecessary repetition of the incoming signal operation.

Figure 3:
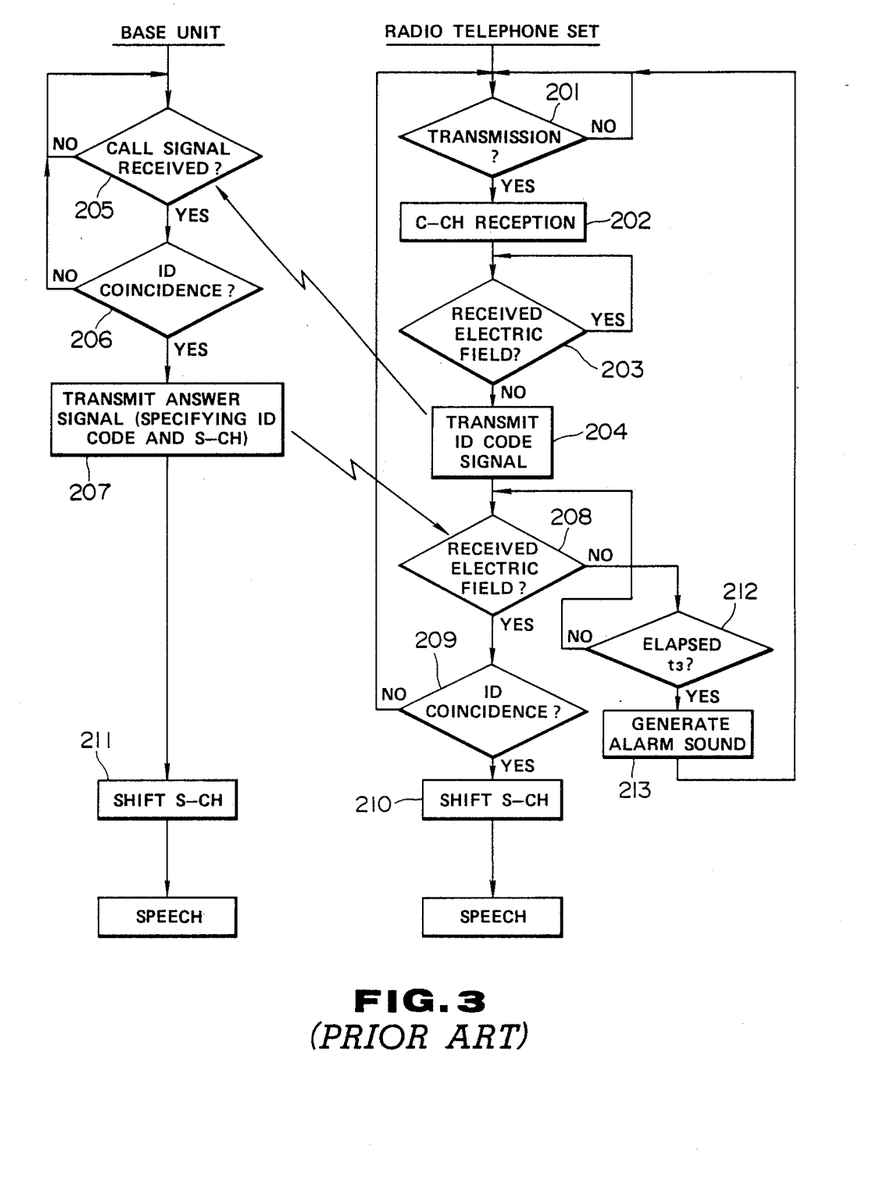
FIG. 3 is a flowchart for explaining the operation of the radio telephone system of FIG. 1 when transmitting a signal.

FIG. 3 shows a flowchart for explaining the operation of the system when signal transmission is done from the side of the radio telephone set 2.

More specifically, when the user turns on the switch 25 to call a party at the end of the wire telephone line 3, the control circuit 22 makes the determination to shift the telephone set to its signal transmission mode on the basis of the switch 25 turned on (step 201), and controls the synthesizer 19 to cause the oscillation frequency of the synthesizer 19 to be locked at the control channel and to cause the receiver 14 to be turned on to thereby receive radio waves on the control channel (C-CH) (step 202). The intensity of the electric field of the received waves on the control channel is detected by the received-field strength detector 20. If the field intensity of the received signal does not exceed a predetermined level, then the control circuit determines that the control channel is idle (step 203) and turns on the transmitter 17 to transmit an ID code signal inherently assigned to the own telephone set (step 204). The base unit 1, when receiving this ID code signal, judges whether or not the received ID code coincides with an ID code uniquely allocated to a combination of the radio telephone set 2 and the base unit 1 (steps 205 and 206). If the base unit determines a coincidence, then it turns on the transmitter 5 to transmit an answer signal (containing the ID code and speech channel (S-CH) specifying information) for the telephone set 2 (step 207).

The radio telephone set 2 receives such an answer signal from the base unit 1 (step 208) and determines whether or not the ID code contained in the answer signal coincides with its own ID code (step 209). An ID code coincidence causes the oscillation frequency of the synthesizer 19 to be swiched to the frequency of the speech channel specified by the base unit 1 (step 210). The base unit itself, after transmitting the answer signal, also changes the oscillation frequency of the synthesizer 9 to the frequency of the speech channel specified for the purpose of the speech (step 211). As a result, the base unit 1 is connected to the radio telephone set 2 through a speech channel specified by the base unit 1. Thereafter, the user can call the party telephone set connected to the wire telephone line 3 by means of the dialling operation of dial keys 26, thus enabling the conversation with the party.

The ID code signal is transmitted from the radio telephone set 2 to the base unit 1. However, in the event where the telephone set 2 cannot receive an answer signal from the base unit 1 even after passage of a time t3 for such reasons as a distance that is too far between the base unit 1 and the telephone set 2 or the like, the control circuit 22 controls the loud speaker 23 to cause an alarm tone to be generated from the speaker 23 at the stage of passage of the time t3, thus informing the user of the disabled interconnection between the telephone set and the base unit (steps 212 and 213).

Although the speech communications or the interconnection control communications prior to the speech communications between the base unit 1 and the radio telephone set 2 has been explained in connection with the case where such communications is carried out through such individual radio channels as the aforementioned speech channel (S-CH) and the control channel (C-CH) in the illustrated embodiment, there may also be provided such a radio telephone system that only one sort of radio channel (speech channels) are used to carry out these interconnection control and speech communications.

In the both types of radio telephone systems, a predetermined threshold value (for example, 20 dB$\mu$V) indicative of a predetermined intensity of the electric field of the received signal is previously set in the received-field stregth detector 20 so that, when the intensity of the electric field of the received signal shown by the output of the receiver 14 exceeds the threshold value (20 dB$\mu$V), the detector 20 judges that the intensity of the received electric field is at such a level that allows radio communications. If the radio telephone set 2 kept in its communication mode is moved far from the base unit 1 and the intensity of the received electric field becomes correspondingly much smaller than the threshold value (20 dB$\mu$V), then the received-field strength detector circuit 20 determines that the field intensity of the received-signal does not reach such a level that allows radio communications and applies a signal indicative of this effect to the control circuit 22.

When the control circuit 22 receives this signal indictive of the lack of the received electric field intensity, it causes the loud speaker 23 to generate such an out-of-communication-range signal as an alarm sound. This allows the user to know the reduced electric field intensity. However, if such a reduced field intensity continues, that is, if a predetermined time (for example, 10 seconds) elapses after the signal indicative of the lack of the electric field intensity has generated, then the control circuit 22 disconnects the once-connected radio line. In other words, the control circuit 22 reports the effect to the base unit 1 via the transmitter and thereafter, turns off the receiver 14 and the transmitter 17 to return the radio telephone set to its initial operational state (the state of the first step in FIGS. 2 and 3). The base unit 1 itself is returned to the initial state in response to the aforementioned report from the radio telephone set 2.

This arrangement is intended to secure the communication quality. That is, when the intensity of the received electric field is reduced to a low level, it becomes difficult to secure the articulation of the speech due to the noise of the radio line. This arrangement is further intended to prevent any interference with other radio telephone sets and secure a high reliability in transmission of the dial signal (which correspond to the processings of the steps 212 and 213 in FIG. 3).

In this way, the prior art radio telephone system, which is arranged to allow the speech maintenance and the like only when the received electric field intensity is kept at a level exceeding the constant threshold value (for example, 20 dBμV) preset for the received electric field intensity, is surely effective in securing the aforementioned speech quality, preventing any interference with other radio telephone sets or securing the reliability of the dialling signal; but is ineffective in satisfying such a demand, for example, that "the user wishes to move the telephone set to a place (location) out of the communication range where the intensity of the received electric field is kept to be higher than the aforementioned threshold value, while securing the speech communication". That is, the prior art is defective from the viewpoint of a so-called flexibility.

SUMMARY OF THE INVENTION

It is an object of the present invention to provide a radio telephone system which can realize control of the more flexible interconnection between a base unit and a plurality of radio telephone sets by means of the aforementioned received electric field intensity.

That is, in the present invention, the received-field strength detector is of a so-called variable threshold level type in which a threshold level on the received electric field intensity is arbitrarily changed through the proper operation of an operating member disposed on the side of the radio telephone set, and a signal used for comparative judgement of the presence or absence of the received electric field intensity allowing the radio communication is applied to the control circuit of the radio telephone set.

With such an arrangement, even when the user wishes to move the telephone set to a place separated from the base unit by more than a predetermined distance, it becomes possible to maintain the speech communication as necessary according to user's demand, whereby the highly flexible use of the radio telephone system can be realized.

It goes without saying that the suitable selection of the variable threshold level according to the actual circumstances also enables the realization of the functions provided based on such threshold level in the prior art, that is, the achievement of such maintenance of the speech quality, prevention of any interference with other telephone sets, securing of the reliability of the dialling signal and so on as mentioned above.

DESCRIPTION OF THE PREFERRED EMBODIMENT

An embodiment of the present invention will be explained with reference to the accompanying drawings.

Figure 4:
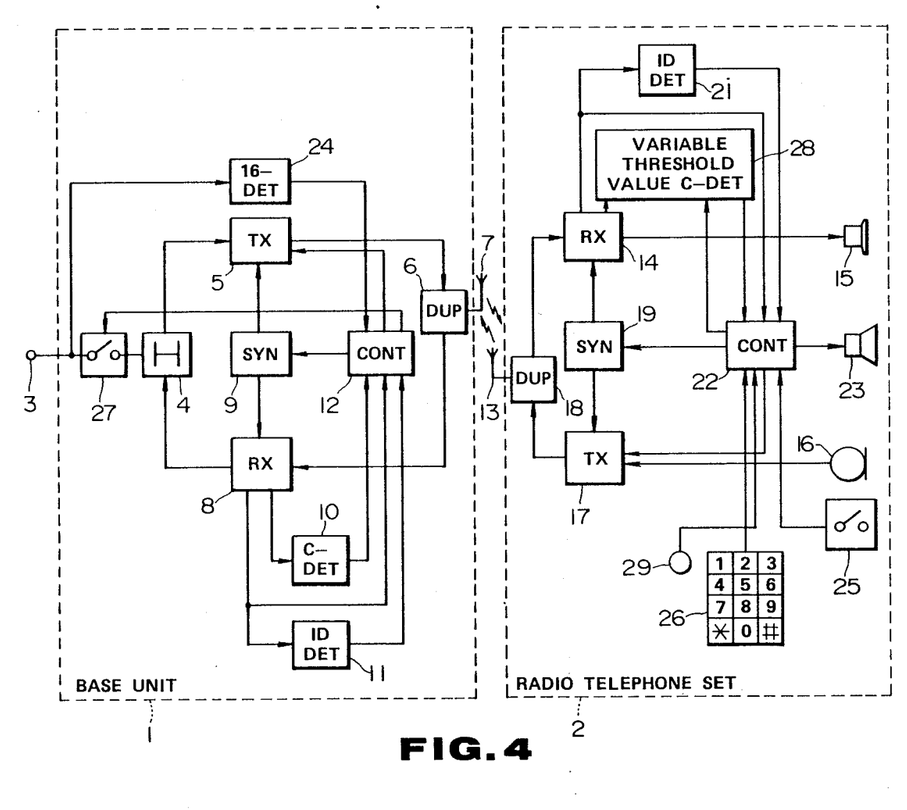
FIG. 4 is a block diagram showing an arrangement of an embodiment of a radio telephone system in accordance with the present invention.
Figure 5:
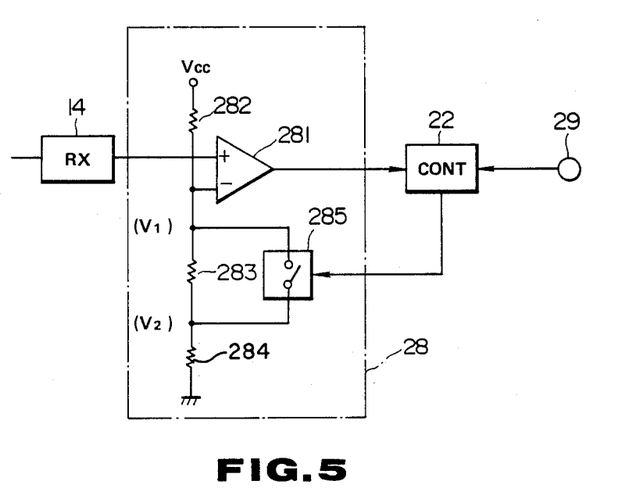
FIG. 5 is a circuit diagram showing an exemplary arrangement of a received-field strength detector of a variable threshold level type shown in FIG. 4.

Referring to FIG. 4, there is shown a block diagram of an embodiment of a radio telephone system in accordance with the present invention, in which an operating key (which comprises a key switch or a push-button switch) 29 for changing the threshold level for the intensity of the electric field of a received signal is newly added to the radio telephone set 2 of the radio telephone system shown in FIG. 1, and a received-field strength detector 28 of a variable threshold level type having such an arrangement as shown, for example, in FIG. 5 is added in place of the received-field strength detector 20 in the radio telephone set 2 shown in FIG. 1. In the drawing, elements performing substantially the same functions as those in the prior art system of FIG. 1 are denoted by the same reference numerals and explanation thereof will be omitted to avoid the repeated same explanation.

The received-field strength detector of the variable threshold level type comprises, as shown in FIG. 5, a comparator 281, resistors 282, 283 and 284 connected in series with each other, and a normally-opened switch 285 connected in parallel to the resistor 283.

Figure 6:
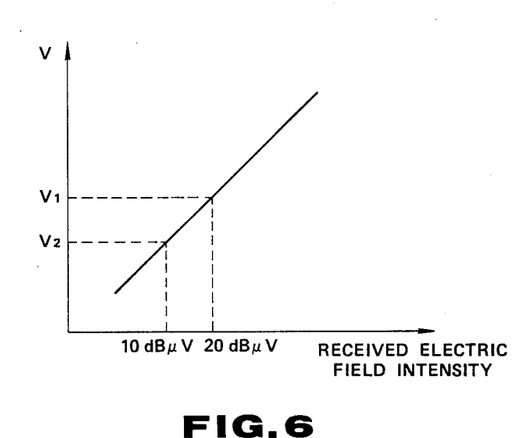
FIG. 6 is a graph showing a relationship between the intensity of the electric field of a received signal and the threshold voltage.

Applied to a plus terminal (non-inversion input) of the comparator 281 from the receiver 14 is a signal which corresponds to the intensity of the electric field of the received signal of the radio telephone set 2, that is, such a DC voltage V as shown by a graph in FIG. 6. Applied to a minus terminal (inversion input) of the comparator 281, on the other hand, is normally a DC voltage $V_1$ which appears at a junction between the resistors 282 and 283, that is, a DC voltage (which is a first threshold voltage) which corresponds to a received electric field intensity of 20 dBμV in the graph of FIG. 6. When the switch 285 is closed, the comparator 281 receives at its minus terminal a DC voltage $V_2$ which appears at a junction between the resistors 282 and 283, that is, a DC voltage (which is a second threshold voltage) which corresponds to a received electric field intensity of 10 dBμV in the graph of FIG. 6. The comparator 281 compares the input voltage received at the plus terminal with the input voltage received at the minus terminal, applies a signal of logical level "1" to the control circuit 22 if the input voltage at the plus terminal exceeds that at the minus terminal, and applies a signal of logical level "0" to the control circuit 22 if the plus terminal input voltage does not reach the minus terminal input voltage.

In the event that the radio telephone system is put in its speech mode, that is, the radio telephone set 2 is connected through the radio line to the base unit 1, if the received electric field intensity of the radio telephone set 2 exceeds a level of 20 dBµV, then the DC voltage V in the graph of FIG. 6 supplied from the receiver 14 to the received-field strength detector 28 exceeds the DC voltage $V_1$ as the first threshold voltage. Accordingly, the comparator 281 in the received-field strength detector 28 has applied at its plus terminal the DC voltage V which exceeds the DC voltage $V_1$ being applied to the minus terminal, so that the comparator 281 applies the signal of logical level "1" to the control circuit 22. The circuit 22, when receiving the signal "1", judges that the intensity of the received electric field is at such a level that allows radio communication and maintains the speech mode of the system.

When the radio telephone set 2 is moved far from the base unit 1 and correspondingly the intensity of received the electric field of the telephone set 2 drops down to a level of less than 20 dBµV, the DC voltage V in the graph of FIG. 6 supplied from the receiver 14 to the received-field strength detector 28 becomes lower than the DC voltage $V_1$ of the first threshold voltage. This causes the comparator 281 of the received-field strength detector 28 to receive its plus terminal the DC voltage V that is lower than the DC voltage $V_1$ being applied to the minus terminal. This results in the comparator 281 applying the signal of logical level "0" to the control circuit 22. The circuit 22, when receiving the signal "0", judges that the received electric field intensity does not reach such a level that allows the radio communication and controls the loud speaker 23 to cause the speaker 23 to generate such an out-of-communication-range alarm as an alarm sound. Listening to the alarm, the user can know that the received electric field intensity is low. However, the system itself can be operated so that the continuation of such low received electric field intensity causes the control circuit 22 to disconnect the radio line as in the aforementioned case.

When the user depresses the operating key 29 within a predetermined time (for example, 10 seconds) after the control circuit 22 causes the generation of the out-of-communicaiton-range alarm, the control circuit 22 responsive to the key depression causes the switch 285 of the received-field strength detector 28 to be closed. In this case, the comparator 281 has applied at its minus terminal the DC voltage $V_2$ of the second threshold voltage. Under such a condition, if the intensity of the received electric field of the radio telephone set 2 is lower than a level of 20 dBµV but higher than a level of 10 dBµV, then the DC voltage V in FIG. 5 supplied from the receiver 14 to the received-field strength detector 28 exceeds the DC voltage $V_2$ of the second threshold voltage. This results in the comparator 281 receiving at its plus terminal the DC voltage V that exceeds the DC voltage $V_2$ being applied to the minus terminal and thus the comparator 281 applies the logical level signal "1" to the control circuit 22. The circuit 22, when receiving the logical signal "1", judges that the intensity of the received electric field is at such a level that allows the radio communication and keeps the speech mode without disconnecting the radio line. That is, under such a condition that the received electric field intensity is lower than a level of 20 dBµV, the user's depression of the operating key 29 causes the system to be kept in the speech mode, so long as the received electric field intensity exceeds a level of 10 dBµV.

In the case where the radio telephone set 2 is moved further apart from the master unit 1 and the received electric field intensity correspondingly drops down to a level of less than 10 dBµV, the DV voltage V smaller than the DC voltage $V_2$ of the second threshold voltage is supplied from the receiver 14 to the comparator 281. Accordingly, the signal applied from the comparator 281 to the control circuit 22 is changed again to the signal of logical level "0" so that the control circuit 22 judges that the received electric field intensity does not reach a level for radio-communication. Thereafter, as in the above case, an out-of-communication-range alarm is emitted from the loud speaker 23 and the continuous emission of the alarm beyond a predetermined timer time causes the control circuit 22 to automatically disconnect the radio line.

In this way, in accordance with the present invention, since the threshold value of the intensity of the received electric field can be modified with ease, a so-called 'radio communication area' where radio communication is permitted by means of the radio telephone system can be arbitrarily expanded to realize the flexible utilization of the radio telephone system.

Figure 7:
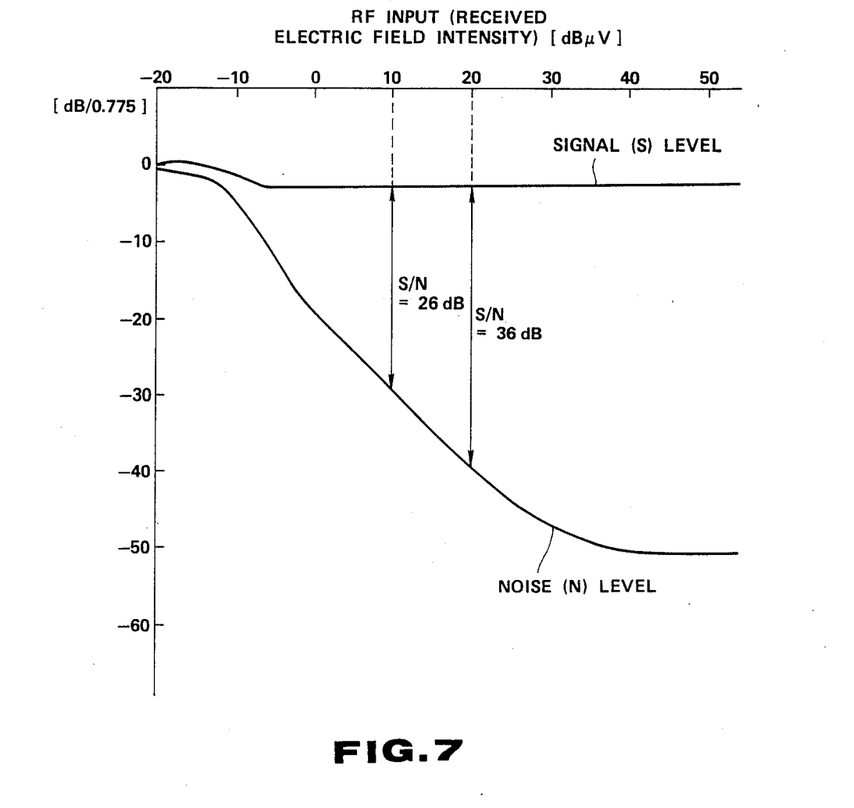
FIG. 7 is a graph showing a relationship between the intensity of the electric field of a received signal and the S/N ratio.

FIG. 7 is a graph which shows a relationship between the intensity of the received electric field and the S/N ratio. It will be clear from the graph that the S/N ratio with respect to a signal field intensity of 10 dBµV is lower by about 10 dB than that with respect to a received electric field intensity of 20 dBµV. However, it has been confirmed from the inventors' experiments that such a level (about 26 dB) of S/N ratio will not cause any difficulties in the usual conversation or speech. When it is desired that the expansion of the radio communicative area takes priority of the speech quality, however, the threshold voltage can employ a voltage corresponding to a received electric field intentisy of 0 dBµV.

Figure 8:
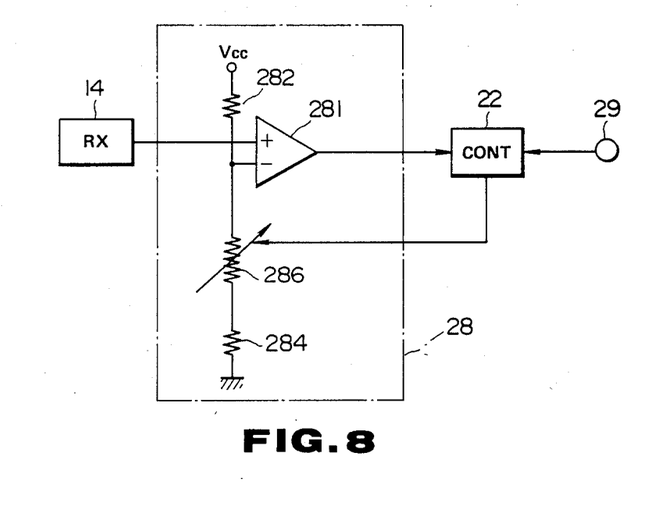
FIGS. 8, 9, 10, 11 and 12 are circuit diagrams showing different examples of the arrangement of the received-field strength detector of the variable threshold level type shown in FIG. 4 and its peripheral elements, respectively.

Although such a circuit of a two-threshold-level selection type as shown in FIG. 5 has been employed as the received-field strength detector 28 of the variable threshold level type in the foregoing embodiment, such a circuit as shown in FIG. 8 may also be used as the detector 28.

That is, the detector 28 of FIG. 8 comprises a variable resistor 286, the resistance of which is continuously or stepwise varied in direct proportion, for example, to the operating time or frequency of the operating key 29 so that the aforementioned threshold voltage correspondingly changes continuously or stepwise to, for example, a level between the above-mentioned DC voltages $V_1$ and $V_2$.

In this case, the resistance control of the variable resistor 286 based on the operating time or frequency of the operating key 29 is carried out by means of the control circuit 22. However, if a variable resistor provided with a servo mechanism, a programmable attenuator or the like, for example, is used in place of the variable resistor 286, then the corresponding control circuit may be easily arranged by known techniques.

Figure 9:
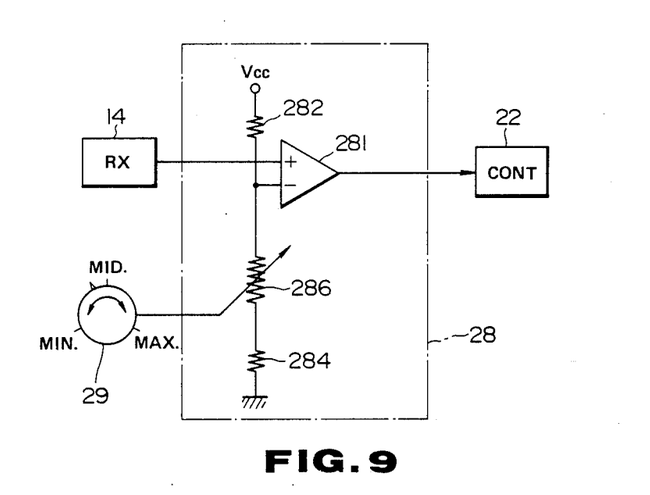

Further, with the use of the variable resistor 286, the operating key 29 may be merely replaced by a knob portion of a slider of the resistor 286 as an operating member 29' as shown in FIG. 9 so that the resistive value of the resistor 286 varies with the manual operation of the member 29'.

Although the resistor 284 has been provided even in the detecting circuit 28 of FIGS. 8 and 9 for guaranteeing at least the DC voltage $V_2$ of the second threshold voltage, in the event where, as in the above case, it is desired for the expansion of the radio communication area to take priority of the speech quality, the resistor 284 may be short-circuited.

Figure 10:
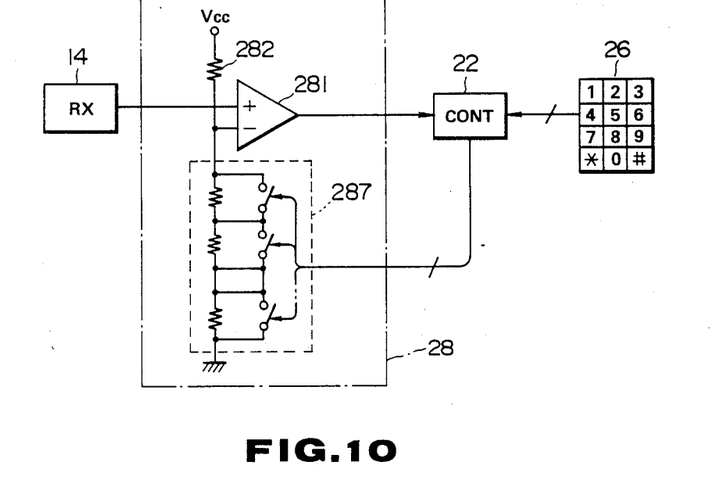

There is shown in FIG. 10 a different embodiment of the detector 28 wherein the function of the operating key 29 is replaced with the dial key unit 26. In this case, a programmable attenuator 287 is provided as shown in FIG. 10 in the received-field strength detector 28 of the variable threshold level type so that the threshold voltages are set respectively at different levels on the basis of the different information (frequency information) of the respective keys of the dial key unit 26. It is of course possible to provide the same arrangement as in FIG. 5 or 8 to the detector 28 but with the operating key 29 being equivalent to all or a specific one of the keys of the dial key unit 26. As is well known, the dial key unit 26 can be used also as such an information generating means even in the speed mode of the dial unit 26.

With the received-field strength detector 28 of the variable threshold level type shown in FIGS. 5, 8 or 9, the threshold value can be arbitrarily modified even in a mode other than the speech mode, but it is preferable to secure such a predetermined threshold value as has been explained as the first threshold voltage (DC voltage $V_1$) at least during the transmission of the dial signal from the radio telephone set 2, since the dial signal transmitted from the telephone set 2 must be highly accurate in the aforementioned signal transmitting operation of the telephone set 2. In this connection, such a circuit as shown, for example, as in FIG. 11 is effective for inhibiting the modification of the threshold value in the non-speech mode.

Figure 11:
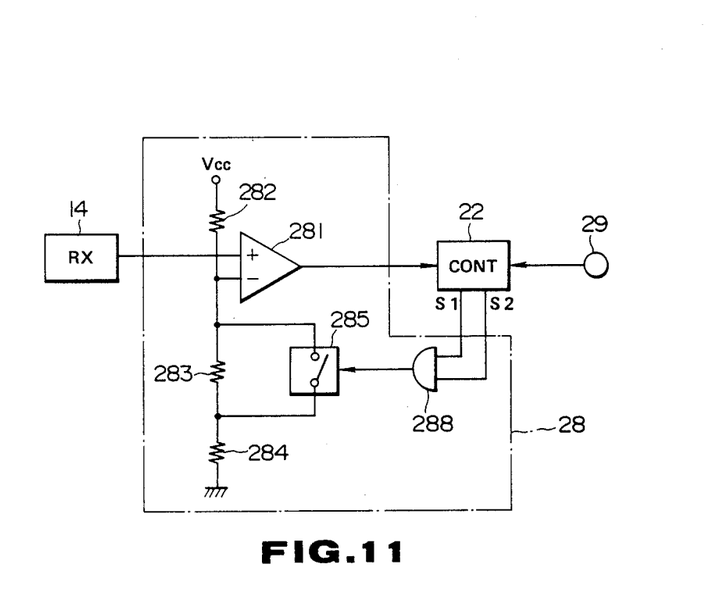

More specifically, the received-field strength detector 28 of the variable threshold level type of FIG. 11 comprises an AND circuit 288 which turns on the switch 285 on the basis of a logical product condition of two signals S1 and S2 received from the control circuit 22, the signal S1 having a logical level "1" when all the processings shown in FIG. 2 or 3 are completed and the control circuit 22 is put in its speech state and having a logical level "0" in the other state, the signal S2 having a logical level "1" when the operating key 29 is operated and having a logical level "0" in the other state. With such an arrangement, the unnecessary quality reduction of various sorts of signals (including the dial signal) to be exchanged in the control of the interconnection with the master unit 1 can be avoided.

Figure 12:
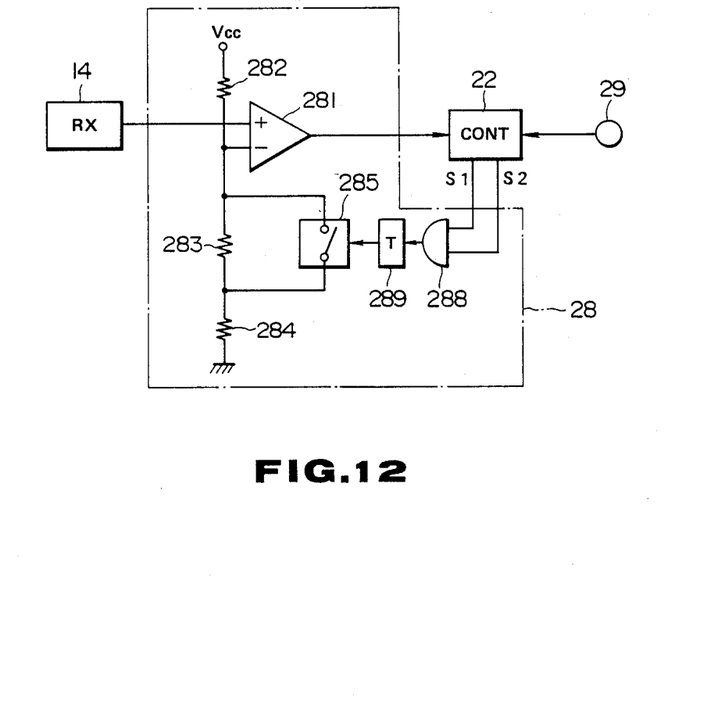

Referring to FIG. 12, there is yet a different embodiment of the received-field strength detector 28 in which a suitable timer circuit 289 is interposed between the AND circuit 288 and the switch 285 so that the passage of a predetermined time after modification of the threshold value causes the threshold value to be automatically returned to the original predetermined threshold level (for example, the aforementioned first threshold voltage) for the purpose of preventing the unnecessary deterioration of the speech quality even in the speech mode.

It goes without saying that such an arrangement using the AND circuit 288 and the timer circuit 289 is not limited to that of the circuit shown in FIG. 5 but may be similarly applied to the circuits shown in FIGS. 8 and 10.

Although the arrangement of the received-field strength detector 28 allowing the variable threshold value of the intensity of electric field of the received signal on the side of the ratio telephone set 2 has been explained in the foregoing embodiments, such a received-field strength detector of the variable threshold level type may also be similarly applied to the received-field strength detector 10 on the side of the master unit 1. In this case, a threshold level changing command based on the operation of such an operating member as the operating key 29, the dial key unit 26 or the like is transmitted to the master unit 1 through the radio communication line.

What is claimed is:

1. A radio telephone system comprising:
base unit means connected to a wire telephone line;
telephone set means having dial means, transmitter means and receiver means; and
radio control means for controlling interconnection between said base unit means and said telephone set means through a radio line, said radio control means comprising:
detection means for detecting a received intensity of an electric field received through said radio line by comparing an actually received electric field intensity with a selected one a plurality of set threshold values for the field intensity;
control circuit means for maintaining an interconnection mode through said radio line when said detection means detects that said received electric field intensity is larger than said selected threshold value; and
an operating member for selecting an arbitrary one of said plurality of set threshold values according to an arbitrary manipulation by an operator;
wherein said detection means, said control circuit means and said operating member are disposed in said radio control means of said telephone system, said radio control means being located in said telephone set means; and
wherein said set threshold values of said detection means include a first threshold value corresponding to a first value of said received electric field intensity and a second threshold value corresponding to a second value smaller than said first value, and said detection means selects said first threshold value when said operating member is not operated and said second threshold value when said operating member is operated.

2. A radio telephone system according to claim 1, wherein said first value corresponds to a received electric field intensity of 20 db$\mu$V and said second value corresponds to a received electric field intensity of 10 dB$\mu$V.

3. A radio telephone system according to claim 1, wherein said first value corresponds to an electric field intensity of 20 dB$\mu$V and said second value corresponds to a received electric field intensity of 0 dB$\mu$V.

4. A radio telephone system according to claim 1, wherein said detection means enables selection and modification of said threshold values on the basis of logical product conditions that said radio line is in a completed interconnection state and that said operating member is completely operated.

5. A radio telephone system according to claim 1, wherein said detection means further includes a timer circuit which has a set predetermined timer time, and passage of said predetermined timer time after the selection and modification of said threshold value causes the threshold value to be automatically returned to said first value.

6. A radio telephone system according to claim 1, wherein said operating member is used as said dial means of said telephone set means.

7. A radio telephone system comprising:
base unit means connected to a wire telephone line;
telephone set means having dial means, transmitter means and receiver means; and
radio control means for controlling interconnection between said base unit means and said telephone set means through a radio line, said radio control means comprising:
detection means for detecting a received intensity of an electric field received through said radio line by comparing an actually received electric field intensity with a selected one of a plurality of set threshold values for the field intensity;
control circuit means for maintaining an interconnection mode through said radio line when said detection means detects that said received electric field intensity is larger than said selected threshold value; and
an operating member for selecting an arbitrary one of said plurality of set threshold values according to an arbitrary manipulation by an operator;
wherein said detection means, said control circuit means and said operating member are disposed in said radio control means of said telephone system, said radio control means being located in said telephone set means; and
wherein said detection means continuously presets as said set threshold values, values ranging from a first value of said received electric field intensity to a second value smaller than the first value, and selects said first value when said operating member is not operated and sequentially selects one of said values close to said second value when said operating member is operated in response to an operation amount of said operating member.

8. A radio telephone system according to claim 7, wherein said first value corresponds to a received electric field intensity of 20 dBμV and said second value corresponds to a received electric field intensity of 10 dBμV.

9. A radio telephone system according to claim 7, wherein said first value corresponds to a received electric field intensity of 20 dBμV and said second value corresponds to a received electric field intensity of 0 dBμV.

10. A radio telephone system according to claim 7, wherein said detection means enables selection and modification of said threshold values on the basis of logical product conditions that said radio line is in a completed interconnection state and that said operating member is completely operated.

11. A radio telephone system according to claim 7, wherein said detection means further includes a timer circuit which has a set predetermined timer time, and passage of said predetermined timer time after the selection and modification of said threshold value causes the threshold value to be automatically returned to said first value.

12. A radio telephone system comprising:
base unit means connected to a wire telephone line;
telephone set means having dial means, transmitter means and receiver means; and
radio control means for controlling interconnection between said base unit means and said telephone set means through a radio line, said radio control means comprising:
detection means for detecting a received intensity of an electric field received through said radio line by comparing an actually received electric field intensity with a selected one of a plurality of set threshold values for the field intensity;
control circuit means for maintaining an interconnection mode through said radio line when said detection means detects that said received electric field intensity is larger than said selected threshold value; and
an operating member for selecting an arbitrary one of said plurality of set threshold values according to an arbitrary manipulation by an operator;
wherein said detection means, said control circuit means and said operating member are disposed in said radio control means of said telephone system, said radio control means being located in said telephone set means; and
wherein said detection means stepwise presets as said set threshold values, values ranging from a first value of said received electric field intensity to a second value smaller than the first value, and selects said first value when said operating member is not operated and sequentially selects one of said values close to said second value when said operating member is operated in response to an operation amount of said operating member.

13. A radio telephone system according to claim 12, wherein said first value corresponds to a received electric field intensity of 20 dBμV and said second value corresponds to a received electric field intensity of 10 dBμV.

14. A radio telephone system according to claim 12, wherein said first value corresponds to a received electric field intensity of 20 dBμV and said second value corresponds to a received field intensity of 0 dBμV.

15. A radio telephone system according to claim 12, wherein said detection means enables selection and modification of said threshold values on the basis of logical product conditions that said radio line is in a completed interconnection state and that said operating member is completely operated.

16. A radio telephone system according to claim 12, wherein said detection means further includes a timer circuit which has a set predetermined timer time, and passage of said predetermined timer time after the selection and modification of said threshold value causes the threshold value to be automatically returned to said first value.

17. A radio telephone system comprising:
base unit means connected to a wire telephone line;
telephone set means having dial means, and transmitter means and receiver means; and
radio control means for controlling interconnection between said base unit means and said telephone set means through a radio line, said radio control means comprising:
detection means for detecting a received intensity of an electric field received through said radio line by comparing an actually received electric field intensity with a selected one of a plurality of set threshold values for the field intensity;
control circuit means for maintaining an interconnection mode through said radio line when said detection means detects that said received electric field intensity is larger than said selected threshold value; and an operating member for selecting an arbitrary one of said plurality of set threshold values according to an arbitrary manipulation by an operator;

wherein said detection means, said control circuit means and said operating member are disposed in said radio control means of said telephone system, said radio control means being located in said telephone set means; and wherein said operating member is used as said dial means of said telephone set means, said detection means stepwise presets as said set threshold values, values ranging from a first value of said received electric field intensity to a second value smaller than the first value, and selects said first value when said dial means is not operated and selects a different one of said values other than the first value when the dial means is operated in response to dial information.

18. A radio telephone system according to claim 17, wherein said first value corresponds to a received electric field intensity of 20 dBµV and said second value corresponds to a received electric field intensity of 10 dBµV.

19. A radio telephone system according to claim 17, wherein said first value corresponds to an electric field intensity of 20 dBµV and said second value corresponds to a received electric field intensity of 0 dBµV.

20. A radio telephone system according to claim 17, wherein said detection means enables selection and modification of said threshold values on the basis of logical product conditions that said radio line is in a completed interconnection state and that said operating member is completely operated.

21. A radio telephone system according to claim 17, wherein said detection means further includes a timer circuit which has a set predetermined timer time, and passage of said predetermined timer time after the selection and modification of said threshold value causes the threshold value to be automatically returned to said first value.

22. A radio telephone system comprising:

a base unit means connected to a wire telephone line;

telephone set means having dial means, transmitter means and receiver means; and radio control means for controlling interconnection between said base unit means and said telephone set means through a radio line, said radio control means comprising:

detection means for detecting a received intensity of an electric field received through said radio line by comparing the actually received electric field intensity with a selected one of a plurality of set threshold values for the field intensity;

control circuit means for maintaining an interconnection mode through said radio line when said detection means detects that said received electric field intensity is larger than said selected threshold value; and an operating member for selecting an arbitrary one of said plurality of set threshold values according to an arbitrary manipulation by an operator;

wherein said detection means and said control circuit means are disposed in both of said radio control means on the side of said base unit means and said radio control means on the side of said telephone set means and said operating member is disposed in the radio control means on the side of the telephone set means so that the operation information of the operating member is transmitted to the radio control means of the base unit means through said radio line.

23. A radio telephone system comprising:

base unit means connected to a wire telephone line;

telephone set means having dial means, transmitter means and receiver means; and radio control means for controlling interconnection between said base unit means and said telephone set means through a radio line, said radio control means comprising:

detection means for detecting a received intensity of an electric field received through said radio line by comparing an actually received electric field intensity with a selected one of a plurality of set threshold values for the field intensity;

control circuit means for maintaining an interconnection mode through said radio line when said detection means detects that said received electric field intensity is larger than said selected threshold value and for terminating said interconnection mode when said detection means detects that said received electric field intensity is less than said selected threshold value; and an operating member for selecting an arbitrary one of said plurality of set threshold values according to an arbitrary manipulation by an operator and for changing the threshold value at which said interconnection mode is terminated;

wherein said detection means, said control circuit means and said operating member are disposed in said radio control means of said telephone system.

24. A radio telephone system having a base unit connected to a wire telephone line and a telephone set selectively coupled to said base unit via a radio link, comprising:

establishing means for establishing the radio link between said base unit and said telephone set;

measuring means coupled to said establishing means for measuring a field intensity of signals transmitted over the established radio link;

setting means for setting a threshold level which is variable in response to a user's operation;

comparing means coupled to said measuring means and said setting means for comparing the measured field intensity with the threshold level;

maintaining means responsive to said comparing means for maintaining the established radio link if the level of the measured field intensity is above the threshold level, the threshold level being set by said setting means in response to the user's operation so as to maintain the established radio link; and terminating means responsive to said comparing means for terminating said established radio link if the level of the measured field intensity is below the threshold level set by said setting means as a termination level.

25. The radio telephone system according to claim 24, further comprising:

indicator means coupled to said comparing means for providing an indication to a user of the system when the measured field intensity decreases below a predetermined level.

26. The radio telephone system according to claim 24, wherein said maintaining means fails to maintain the established radio link on the condition that the measured field intensity has been below the threshold for a predetermined time period.

27. A method for continuing to maintain an established radio link for use in a radio telephone system, comprising the steps of:
  measuring a level of a field intensity of signals transmitted over the established radio link;
  setting a threshold level to a first level, the threshold level to be compared with the level of the measured field intensity;
  maintaining the established radio link while the measured field intensity is equal to or above the first level;
  changing the threshold level to a second level which is lower than the first level in response to a user's operation; and
  continuing to maintain the established radio link after the measured field intensity decreases below the first level if the measured field intensity is above the second level.

28. The method according to claim 27, further comprising the step of alarming a user of the system in the event that the measured field intensity decreases below a predetermined level.

29. The method according to claim 27, further comprising the step of terminating the established radio link in the event that the measured field intensity has been below the second level for a predetermined time period.

* * * * *